Figure 1:
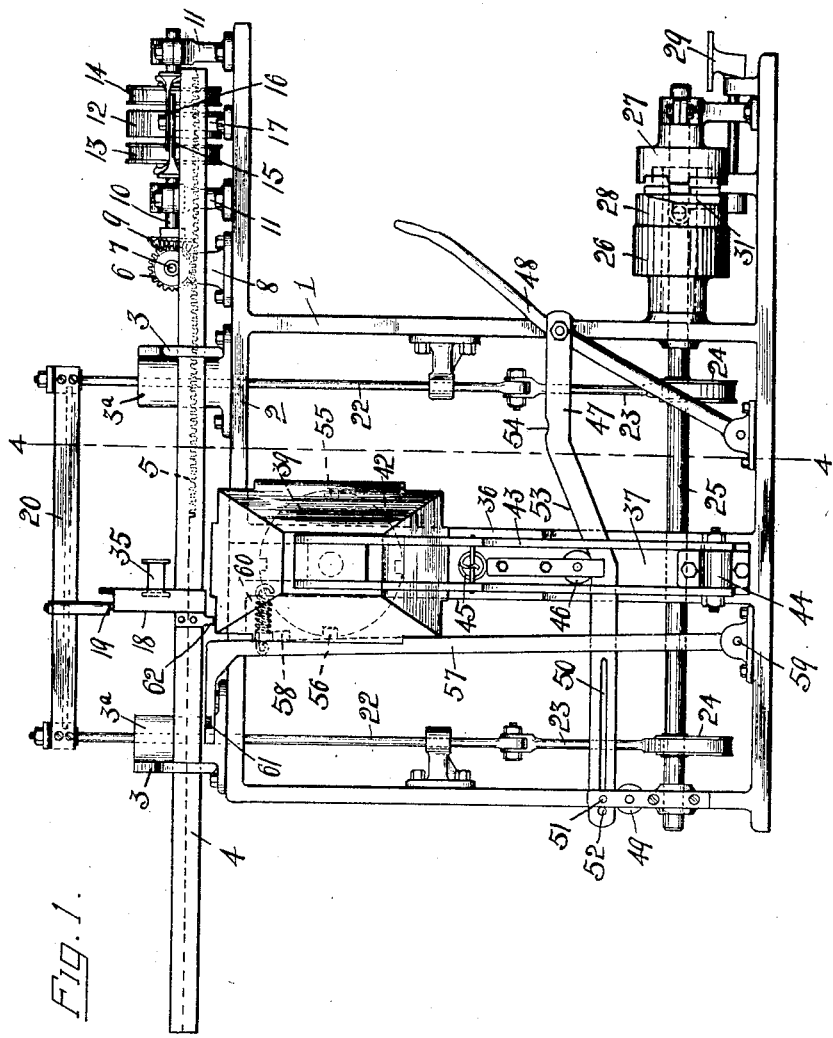

O. H. KILMER AND P. MADISON.
BASKET NAILING MACHINE.
APPLICATION FILED JUNE 2, 1919.

1,349,965.

Patented Aug. 17, 1920.
4 SHEETS—SHEET 1.

INVENTOR
Otto H. Kilmer and
Peter Madison,
By Owen, Owen & Crompton
Attys.

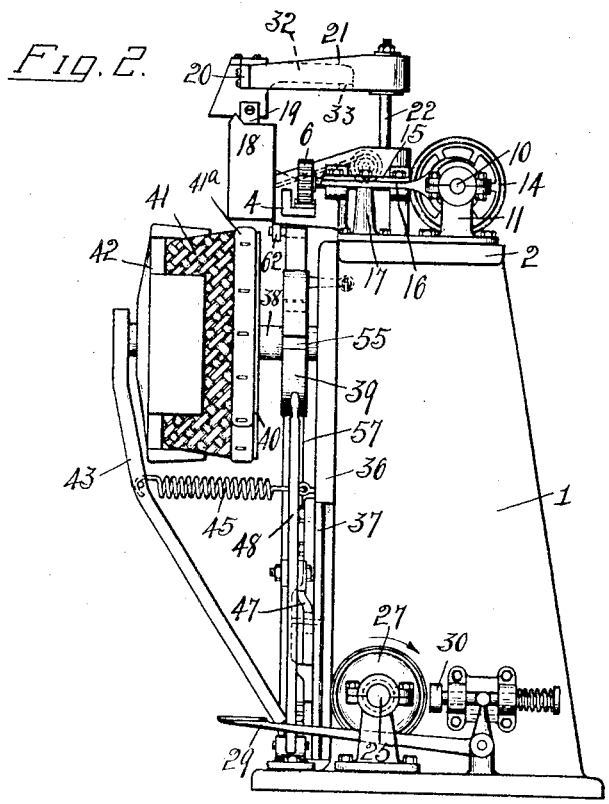
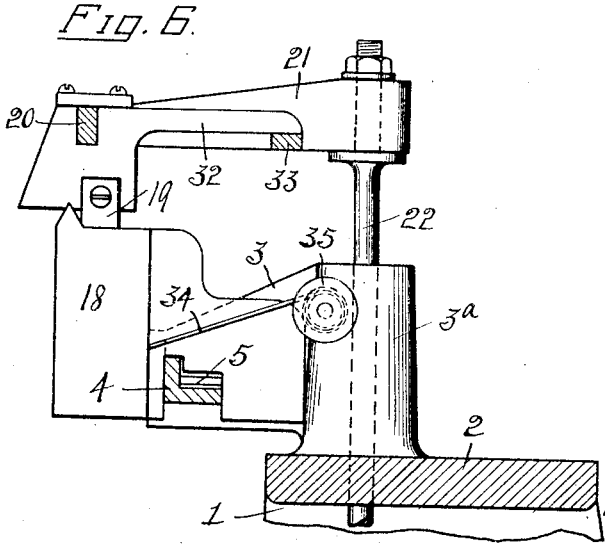

O. H. KILMER AND P. MADISON.
BASKET NAILING MACHINE.
APPLICATION FILED JUNE 2, 1919.
1,349,965.
Patented Aug. 17, 1920.
4 SHEETS—SHEET 3.
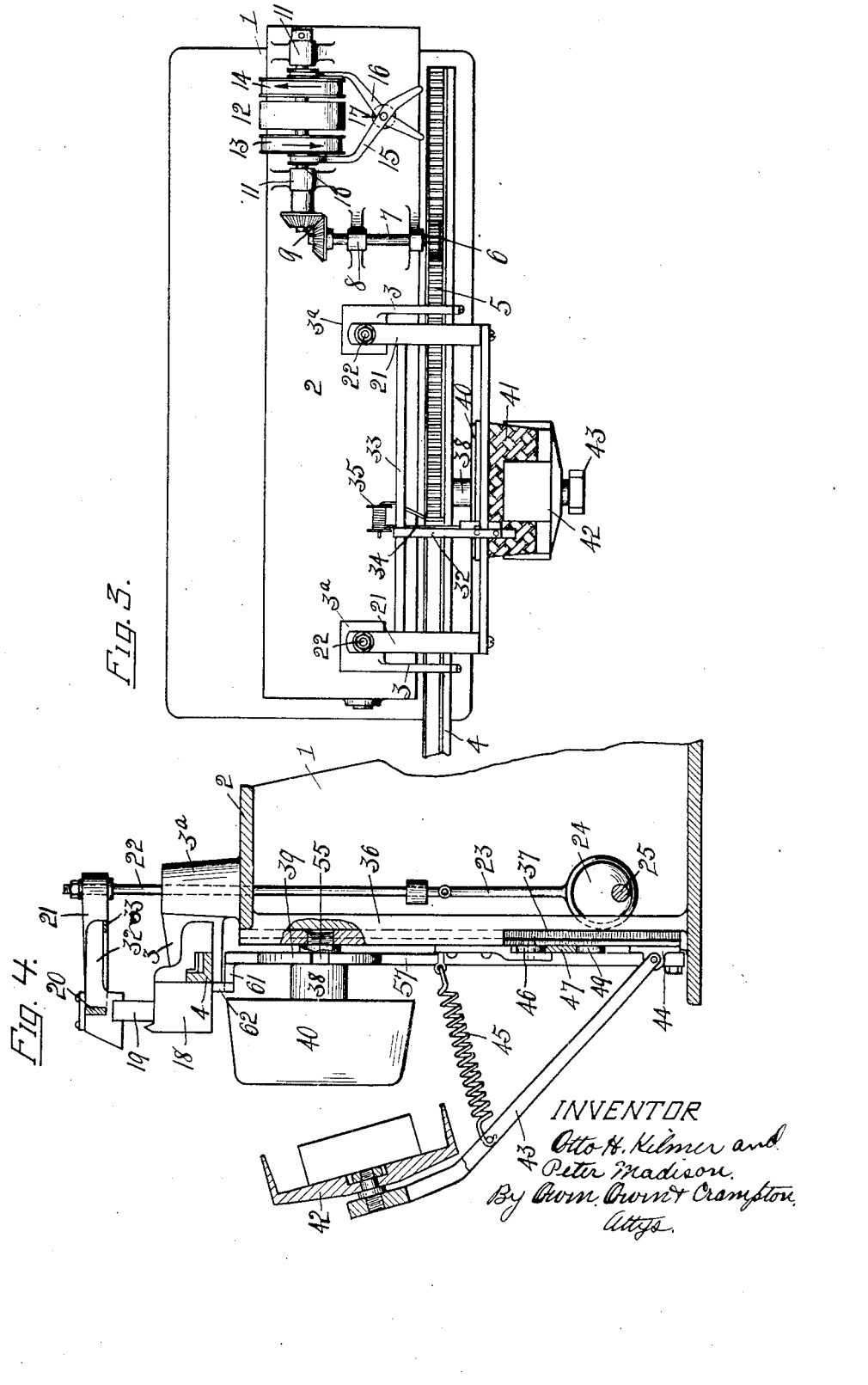
INVENTOR
Otto H. Kilmer and
Peter Madison.
By Owen Owen & Crampton
Attys.

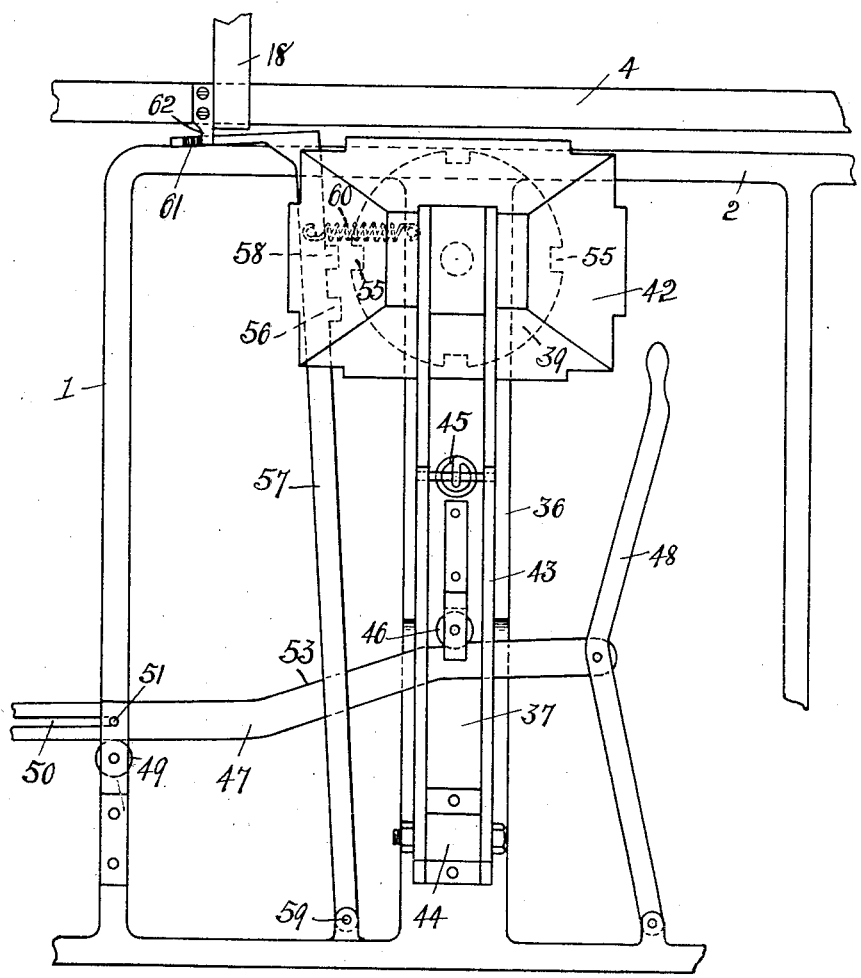

UNITED STATES PATENT OFFICE.

OTTO HENRY KILMER AND PETER MADISON, OF OAK HARBOR, OHIO.

BASKET-NAILING MACHINE.

1,349,965.   Specification of Letters Patent.   Patented Aug. 17, 1920.

Application filed June 2, 1919. Serial No. 301,185.

*To all whom it may concern:*

Be it known that we, OTTO HENRY KILMER and PETER MADISON, citizens of the United States, and residents of Oak Harbor, in the county of Ottawa and State of Ohio, have invented a certain new and useful Basket-Nailing Machine; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of baskets, and particularly to a machine adapted to nail or staple the edge bands around baskets of oblong or rectangular form.

The primary object of the invention is the provision in a machine of the class described, of a form or anvil for holding a basket to be banded, which is easily and quickly rotatable to place any side or end thereof in nailing position, and is also capable of easy and quick adjustment transverse to its axis of rotation to raise or lower the form or anvil as it may be desired to operate on a side or on an end of a basket carried thereby.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a front elevation of a machine embodying the invention, with the basket carrying form lowered in position to place an end thereof in proper relation to the nailing mechanism. Fig. 2 is an end elevation thereof. Fig. 3 is a top plan view thereof. Fig. 4 is a vertical section on the line 4, 4 in Fig. 1, with the basket holding member in section and withdrawn from the form. Fig. 5 is an enlarged fragmentary front elevation of the machine, with the basket holding form in raised position to place a side thereof in operative relation to the nailing mechanism, and Fig. 6 is an enlarged section on a portion of the line 4, 4 in Fig. 1 and showing the nailing mechanism.

Referring to the drawings, 1 designates a frame having the top or table part 2 over which, in suitable bearings 3, is mounted a rack-bar 4 for horizontal longitudinal reciprocatory movements lengthwise of the frame. This bar, in the present instance, is of L-form in cross-section with its horizontally disposed flange provided on the inner side thereof with rack-teeth 5 with which a drive pinion 6 meshes. This pinion is carried by a shaft 7 that is journaled in bearings 8 transversely of the frame top at one end thereof and is connected through a pair of bevel gears 9 to a drive shaft 10 that is journaled in suitable bearings 11 longitudinally of the frame top. The shaft 10 has a clutch member 12 fixed thereto, and loosely mounted on the shaft at either side thereof and shiftable into and out of frictional clutch engagement therewith are drive pulleys 13 and 14 that are driven in opposite directions from any suitable source of power. Shift levers 15 and 16 are connected respectively to the pulleys 13 and 14 and independently operable to throw either pulley into engagement with the member 12. These levers, in the present instance, have a common fulcrum on the top of a bearing standard 17 rising from the frame. It is thus evident that when one of the pulleys 13, 14 is in engagement with the clutch member 12 the rack-bar 4 will be driven in one direction, and that when the other pulley is in engagement with the member 12 the rack-bar will be driven in the other direction, and that such driving only occurs when the operator is exerting a sufficient pressure on the respective control lever to cause a frictional driving of the member 12 by the coacting pulley.

A nailing mechanism 18 of any suitable construction is mounted on the rack-bar 4 for reciprocatory movements therewith intermediate the bearings 3, 3. The driving plunger 19 of this mechanism is slidingly mounted on a cross-bar 20 for movements longitudinally thereof, and this cross-bar has carrying arms 21 extending rearward from its ends and fixedly connected to the upper ends of vertically reciprocable rods 22, which are spaced lengthwise of the frame top 2 and extend down through bearings 3ª mounted thereon and into the lower portion of the frame. The lower end of each rod 22 is connected by a pitman member 23 to an eccentric 24 on a shaft 25, which shaft is journaled in the lower portion of the frame 1 in parallel relation to the rack-bar 4 and has clutch controlled connection with a suitable driving means. This invention, in the present instance, comprises a driven pulley 26, which is loose on the shaft, a clutch member 27 fixed to the shaft, and a shiftable clutch member 28 that turns with the pulley 26 and is movable into and out of engagement with the clutch member 27. When the operator desires to impart rotation to the shaft 25 he depresses a control treadle 29, which moves a roller 30 into engagement with a segmental cam rib 31 on the member 28 and effects a shifting of said member into clutch engagement with the member 27 thus imparting a single revolution to the shaft 25. It is apparent that at each revolution of the shaft 25 a downward nail or staple driving stroke and an upward stroke are imparted to the driving plunger 19. During a down or staple driving stroke of the plunger 19 a slight twisting strain is communicated to the plunger head and to the cross-bar 20, and in order to resist such twisting action the plunger head is provided with a rearward extension 32, which slidingly rides or bears against the top of a cross-bar 33, which connects the arms 21, 21 adjacent to the rods 22.

In the present instance, the nailing mechanism is of the type which automatically feeds a length of wire to the forming parts, severs the fed length, forms it into a staple and drives the formed staple during a down stroke of the plunger. In the present case the wire from which the staple is formed is designated 34 and feeds from a spool or reel 35.

The frame 1 is provided intermediate its sides with a bearing standard 36, which extends between the top and bottom portions of a frame and has a vertically elongated slide 37 guided for vertical reciprocatory movements thereby at its front side. A shaft 38 is carried by and rotatably projects forward from the upper end of the slide 37 and carries an index wheel 39 and at its forward or outer end a form or anvil 40 for carrying the work to be operated on. The form 40 is of a shape to fit and permit the mounting of a basket 41 thereover and such basket is held to its position thereon by a holding clamp 42. This clamp is rotatably carried at its outer side by an arm 43 with its axis of rotation concentric to the shaft 38 when the clamp is in holding engagement with the basket mounted on the form 40, and the lower end of the arm 43 is pivoted to a bracket 44 which is fixed to the lower end of the slide 37 for vertical movements therewith. A coiled contractile spring 45 connects the arm 43 and slide 37 intermediate their ends and acts to normally retain the arm and its clamp in clamping relation to the form 40.

The slide 37 carries an anti-friction roll 46 adjacent to its lower end and this roll rests on a horizontally movable supporting slide-bar 47 that is carried at one end by a control lever 48 and rests at its opposite end on a supporting roller 49 carried by the frame 1. The end of the slide bar 47, which rests on the roll 49, is provided with a guide slot 50 for receiving a guide pin 51 projecting from the frame. A stop pin 52 is provided at the outer end of the slide-bar 47 for stop coaction with the frame. The slide-bar 47 is provided with an incline 53 which, when the bar is moved, coacts with the roll 46 to raise or lower the slide 37 depending on the direction of movement of the slide bar. The extent of such vertical movement of the slide 37 is determined by the relative difference between the length and width of the form 40, it being intended that the extent of movement shall be the difference between the distance from the center of the form to a side thereof and from such center to an end of the form so that when the form is disposed with a side thereof in horizontal position, it may be raised to proper operative relation to the nailing mechanism, and when an end thereof is disposed in horizontal position the form may be lowered to place such end in operative relation to the nailing mechanism. When the slide-bar 47 is moved to place the form in elevated position the roll 46 rests in a slightly depressed seat 54 provided in the bar at the upper end of the incline.

The index-wheel 39 is provided in its periphery with a number of notches 55 corresponding to the number of sides of the form 40 (four in the present instance), and if the form and index-wheel are in lowered position the notches are engaged and the wheel and form locked against turning by a lower catch lug 56 on a vertically disposed rocker arm 57, and if the wheel and form are in elevated position, said notches may be engaged and the form locked against rotation by an upper catch lug 58 on said rocker arm. The rocker arm 57 is pivoted at its lower end to the lower portion of the frame, as at 59, and a coiled contractile spring 60 acts on its upper end to yieldingly hold one or the other of the catch lugs 56, 58 in engagement with a registering notch 55 in the index-wheel. The upper end of the arm 57 is outwardly angled and provided with a lug 61, which is engaged by a registering lug 62 on the rack-bar 4 when the rack-bar is moved a predetermined distance to the left, and a continuation of such movement with the lugs in engagement causes an outward movement of the rocker arm to withdraw its lugs 56, 58 from wheel catch engaging position.

The operation of the machine is as follows:—The operator places a basket 41 on the form 40, having first withdrawn the clamp 42 for such purpose, and then permits the clamp to return to firmly hold the basket on the form. A band 41ª is then placed around the exposed end of the basket and the nailing mechanism 18 moved to the right to desired nailing position by throwing the desired pulley 13, 14 into engagement with the clutch member 12, which causes movement to be imparted to the right to the rack-bar 4 and attached nailing mechanism. When the nailing mechanism has been moved to the desired position, a further movement of the rack-bar is stopped and the operator depresses the treadle 29 to impart a revolution to the shaft 25 and to cause a nail or staple, as the case may be, to be driven into the band and basket and clenched by the form against which it is driven. The operator then, in the same manner as before, moves the nailing mechanism to the right a desired distance for the next nailing operation and again depresses the treadle to actuate the nail driving plunger. This is repeated until the end or side of the basket, which is being nailed, has been completed. The operator then causes a return of the rack-bar 4 and the nailing mechanism to the left by throwing the proper pulley 13, 14 in engagement with the clutch member 12, and when the rack is near the end of its stroke the lug 62 thereon engages the lug 61 on the rocker arm 57 and moves said arm to withdraw its catch lug 56 or 58 from the engaged notch 55 in the index-wheel. If the nailing was along an end of the basket, as shown in Fig. 1, the operator then turns the form to place a side thereof in horizontal position and moves the control lever 48 to the left to effect a raising of the slide 37, shaft 38, index-wheel 39, form 40 and clamp 42, 43 a desired extent to place the uppermost side of the basket in proper nailing relation. The operator then goes through the same operations as before to move the nailing mechanism to successive nailing positions, drive nails or staples into the band, and release the rocker arms 57 to permit the catch lug 58 thereof to move into holding engagement with a registering notch in the index-wheel. When this is completed the rack-bar 4 and nailing mechanism is returned to starting position to effect a release of the rocker arm 57 from holding engagement with the index-wheel, the wheel and form then being turned to place the remaining end in uppermost position and the control lever 48 is moved to the right to lower the form to place such end in the nailing plane. It is evident that these operations are continued until the band has been nailed or stapled to each side of the basket.

It is evident that we have provided a simple and efficient machine for nailing bands on baskets of elongated form, and that the form or anvil may be rotated and also easily and quickly adjusted vertically to place a side or end thereof in the desired nailing plane, thereby enabling baskets of irregular shape to have the edge bands mechanically nailed or stapled to the respective sides thereof.

We wish it understood that our invention is not limited to any specific construction, arrangement or form of the parts, as it is capable of numerous modifications and changes without departing from the scope of the claims, and that the word "nailing" as used in the claims means either nailing or stapling.

Having thus described our invention, what we claim as new, and desire to secure by Letters Patent is,—

1. In a machine of the class described, a rotatable work-holding form, clamping means for relative work releasing and engaging movements relative to the form and for rotary movements therewith, and means operable to impart predetermined vertical movements to the form and clamping means.

2. In a machine of the class described, a rotatable work-holding form, clamping means for work releasing and engaging movements relative to the form and for rotary movements therewith, means operable to impart predetermined vertical movements to the form and clamping means, and means for releasably holding said form and clamping means against rotary movements.

3. In a machine of the class described, a vertically movable slide member, a work carrying form carried by said member for rotation relative thereto, means movably carried by said member and having a clamp for work holding engagement with the form and for rotation therewith, and means operable to raise and lower the slide member.

4. In a machine of the class described, a vertically movable slide member, a work carrying form carried by said member for rotation relative thereto, means operable to lock the form in different positions of its rotary movement, means movably carried by the slide member and having a clamp for work holding engagement with the form and for rotation therewith, and means operable to raise and lower the slide member.

5. In a machine of the class described, a vertically movable slide member, a work carrying form carried by said member for rotation relative thereto, means movably carried by said member for work holding engagement with the form, and a slide-bar having an incline coacting with a part of said member and operable when longitudinally moved to effect a raising or lowering of said member.

6. In a machine of the class described, a frame, a nailing mechanism carried by said frame for horizontal reciprocatory movements, means selectively operable to impart predetermined movements to said mechanism, manually controlled means for operating said mechanism, a work holding form, means carrying said form for vertical rotary movements and operable to raise and lower the form relative to said mechanism, and means operable to lock the form against rotation when in different positions of its rotary movements and automatically operable to release the form when the nailing mechanism is at a predetermined point in its movement.

7. In a machine of the class described, a frame, a rack-bar horizontally movable in said frame, means operable to move said rack-bar in either direction, a nailing head carried by said bar for movements therewith, manually controlled means operable to reciprocate the nailing head plunger, a slide member carried by the frame for vertical reciprocatory movements below the plane of movement of the nailing mechanism, a work holding form rotatably carried by said member, means movably carried by said member and having a clamping part for work holding engagement with the form and for rotary movements therewith, and means operable to raise and lower the slide member.

8. In a machine of the class described, a frame, a member mounted in the frame for horizontal reciprocatory movements and having a rack bar, a nailing head carried by said member for movements therewith, means connected to said rack bar and operable to move the member a predetermined distance in either direction, basket holding means mounted adjacent to said member and manually controlled means operable to reciprocate the nailing head plunger at any position of movement of the member.

In testimony whereof we have hereunto signed our names to this specification.

OTTO HENRY KILMER.
PETER MADISON.